(12) United States Patent
Kim et al.

(10) Patent No.: US 10,840,793 B2
(45) Date of Patent: Nov. 17, 2020

(54) INDUCED ELECTROMAGNETIC PUMP USING ROTATING MAGNETIC FIELD

(71) Applicant: Ulsan National Institute of Science and Technology, Ulsan (KR)

(72) Inventors: Hee Reyoung Kim, Ulsan (KR); Jae Sik Kwak, Ulsan (KR)

(73) Assignee: Ulsan National Institute of Science and Technology, Ulsan (KR)

(*) Notice: Subject to any disclaimer, the term of this patent is extended or adjusted under 35 U.S.C. 154(b) by 62 days.

(21) Appl. No.: 15/790,052

(22) Filed: Oct. 23, 2017

(65) Prior Publication Data
US 2018/0123439 A1    May 3, 2018

(30) Foreign Application Priority Data

Oct. 28, 2016 (KR) .................... 10-2016-0142365
Mar. 23, 2017 (KR) .................... 10-2017-0036849

(51) Int. Cl.
| | |
|---|---|
| *H02K 44/06* | (2006.01) |
| *H02K 44/04* | (2006.01) |
| *F04B 17/04* | (2006.01) |
| *F04B 15/00* | (2006.01) |

(52) U.S. Cl.
CPC ............ *H02K 44/06* (2013.01); *F04B 17/042* (2013.01); *H02K 44/04* (2013.01); *F04B 15/00* (2013.01)

(58) Field of Classification Search
CPC .......... F04B 15/00; H02K 44/06; H02K 44/04
USPC ............................................. 310/62
See application file for complete search history.

(56) References Cited

U.S. PATENT DOCUMENTS

| | | | | |
|---|---|---|---|---|
| 3,302,573 | A * | 2/1967 | Ledeen ................. | H02K 44/06 417/50 |
| 4,321,958 | A * | 3/1982 | Delassus ............... | H02K 44/06 164/468 |
| 4,505,644 | A * | 3/1985 | Meisner ................ | H02K 44/06 417/50 |

(Continued)

FOREIGN PATENT DOCUMENTS

| | | |
|---|---|---|
| JP | 59-113766 | 6/1984 |
| JP | 11-252892 | 9/1999 |

(Continued)

OTHER PUBLICATIONS

Grounds of Reasons for Rejection dated Mar. 13, 2018 From the Korean Intellectual Property Office Re. Application No. 10-2017-0036849. (4 Pages).

(Continued)

*Primary Examiner* — Essama Omgba
*Assistant Examiner* — Christopher J Brunjes

(57) ABSTRACT

Provided is an induced electromagnetic pump using a rotating magnetic field. The induced electromagnetic pump includes a flow channel pipe through which a conducting fluid passes, a fluid inlet formed at an outer surface of the flow channel pipe in one direction and through which the conducting fluid flows into the flow channel pipe, a fluid outlet formed at the outer surface at which fluid inlet is formed in the same direction thereas and through which the conducting fluid is discharged from the flow channel pipe, and a plurality of electromagnetic coils arranged at certain intervals on one surface of the flow channel pipe and connected to U-phase power, V-phase power, and W-phase.

3 Claims, 8 Drawing Sheets

(56) References Cited

U.S. PATENT DOCUMENTS

| | | | | |
|---|---|---|---|---|
| 2006/0261130 A1* | 11/2006 | Chai | ............... | B23K 3/0653 |
| | | | | 228/56.1 |
| 2009/0285695 A1* | 11/2009 | Kagan | ............... | F04D 7/065 |
| | | | | 417/50 |
| 2010/0263454 A1* | 10/2010 | Araseki | ............... | G01F 1/582 |
| | | | | 73/861.11 |

FOREIGN PATENT DOCUMENTS

| | | |
|---|---|---|
| JP | 2014-096895 | 5/2014 |
| KR | 10-2010-0119799 | 11/2010 |
| WO | WO 2009/142673 | 11/2009 |

OTHER PUBLICATIONS

Grounds of Reasons for Rejection dated Sep. 17, 2018 From the Korean Intellectual Property Office Re. Application No. 10-2017-0036849. (4 Pages).

* cited by examiner

20

INDUCED ELECTROMAGNETIC PUMP USING ROTATING MAGNETIC FIELD

RELATED APPLICATIONS

This application claims the benefit of priority of Korean Patent Applications Nos. 2016-0142365, filed on Oct. 28, 2016 and 2017-0036849, filed on Mar. 23, 2017, the contents of which are incorporated herein by reference in their entirety.

FIELD AND BACKGROUND OF THE INVENTION

1. Field of the Invention

The present invention relates to an induced electromagnetic pump using a rotating magnetic field, and more particularly, to an induced electromagnetic pump configured to transfer a conducting fluid by using a rotating magnetic field.

2. Discussion of Related Art

A general mechanical pump used for transferring a fluid uses a method of rotating a propeller in direct contact with the fluid. This method provides high efficiency but is accompanied by vibrations and noise generated by the propeller. In addition, when a liquid metal having high reactivity is transferred, problems in safety such as sealing of the liquid metal, corrosion of the propeller, and the like may occur.

An electromagnetic pump uses conductivity of a liquid metal and has many advantages, and, since there is no rotor, a packing apparatus which needs air-tightening, and the like, maintenance thereof is unnecessary and additionally a flow rate thereof is easily controllable using an induction regulator when compared to general mechanical pumps.

Due to these advantages, the electromagnetic pump is a critical apparatus not only for systems which use a liquid metal as a coolant such as a fast-breeder reactor and a satellite and need reliability and stability, but also for transportation of applied metals generally used in an industrial field such as aluminum, lead, mercury, and the like.

To allow a liquid metal to have a driving force in an axial direction, the electromagnetic pump uses a method of directly applying currents for generating a magnetic flux necessary for externally driving the liquid metal and a method of generating a magnetic flux in the liquid metal according to a change of alternating magnetic fields. The former case is referred to as a conductive electromagnetic pump, and the latter case is classified as an induced electromagnetic pump. Induced electromagnetic pumps, which, when compared with conductive electromagnetic pumps, do not need additional circuits for supplying power, have recently been researched and have been selected as a pump to use for a liquid metal.

PRIOR ART DOCUMENT

Patent Document (Patent document 1) Korean Patent Publication No. 2010-0119799

SUMMARY OF THE INVENTION

It is an aspect of the present invention to provide an induced electromagnetic pump which transfers an electroconductive fluid such as a liquid metal without contacting the fluid by using a rotating magnetic field.

It is another aspect of the present invention to provide an induced electromagnetic pump which uses a rotating magnetic field and includes circulating pipe equipment miniaturized by designing an inlet and an outlet of a flow channel in the same direction.

Technical aspects of the present invention are not limited to the above description and additional unmentioned technical aspects of the present invention will be understood by those skilled in the art from the following description.

According to one aspect of the present invention, an induced electromagnetic pump includes a flow channel pipe through which a conducting fluid passes, a fluid inlet formed at an outer surface of the flow channel pipe in one direction and through which the conducting fluid flows into the flow channel pipe, a fluid outlet formed at the outer surface at which fluid inlet is formed in the same direction thereas and through which the conducting fluid is discharged from the flow channel pipe, and a plurality of electromagnetic coils arranged at certain intervals on one surface of the flow channel pipe and connected to U-phase power, V-phase power, and W-phase.

BRIEF DESCRIPTION OF THE SEVERAL VIEWS OF THE DRAWINGS

The above and other objects, features and advantages of the present invention will become more apparent to those of ordinary skill in the art by describing exemplary embodiments thereof in detail with reference to the accompanying drawings, in which.

DESCRIPTION OF SPECIFIC EMBODIMENTS OF THE INVENTION

Figure 1:
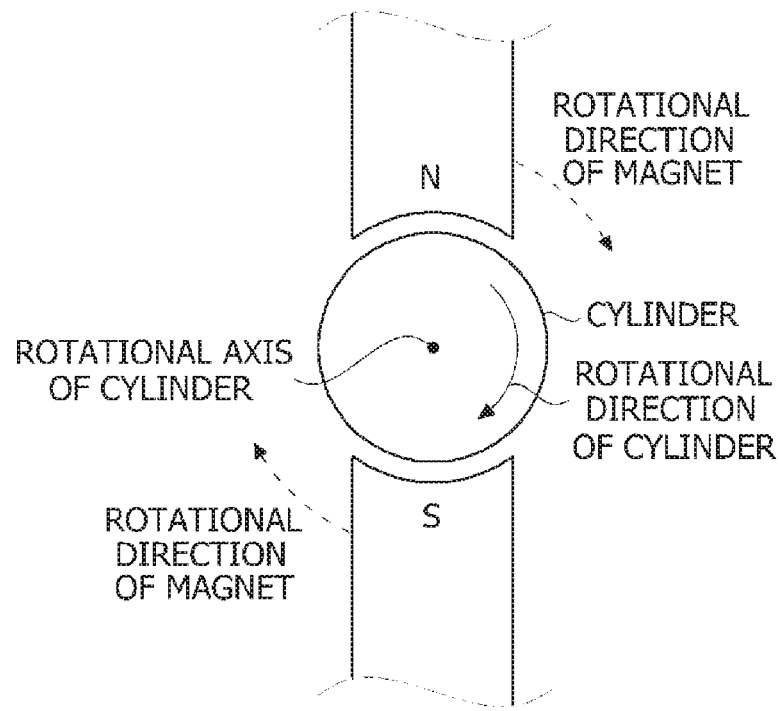
FIG. 1 illustrates an example for illustrating a principle of a general induction motor.

Hereinafter, exemplary embodiments of the present invention will be described in detail with reference to the attached drawings. Advantages and features of the present invention and a method of achieving the same will become apparent with reference to the attached drawings and embodiments described below in detail. However, the present invention is not limited to the embodiments disclosed below and may be embodied in various different forms. The embodiments are simply provided to complete the disclosure of the present invention and to allow one of ordinary skill in the art to completely understand the scope of the present invention, and will be defined by the scope of the claims. Throughout the specification, like reference numerals refer to like elements.

Unless defined otherwise, all of the terms (including technical and scientific terms) used herein may be understood as having meanings commonly understandable by one of ordinary skill in the art. Also, terms defined in generally used dictionaries, unless clearly and particularly defined otherwise, are not to be ideally interpreted or overinterpreted.

FIG. 1 illustrates an example for illustrating a principle of a general induction motor. The principle of the general induction motor will be simply described with reference to FIG. 1.

A general induction motor 10 uses the phenomenon of Arago's rotation. The phenomenon of Arago's rotation is a phenomenon in which, when a circular conducting plate is upright and a magnet is moved in a circumferential direction of the circular conducting plate, the circular conducting plate also rotates with the magnet. Here, an eddy current is induced in the circular conducting plate due to the movement of the magnet according to Fleming's right-hand law. A magnetic field is formed by the eddy current. The circular conducting plate receives a force according to Fleming's left-hand law. The circular conducting plate moves due to the force. A direction of the movement is identical to the movement direction of the magnet.

The induction motor 10 uses a cylinder instead of the circular conducting plate. When the magnet is rotated along a circumference of the cylinder around a rotational axis of the cylinder, the cylinder also rotates in the movement direction of the magnet. The induction motor 10 uses a principle in which, when the magnet is rotated around a cylindrical rotor as described above, the cylindrical rotor rotates.

Figure 2:
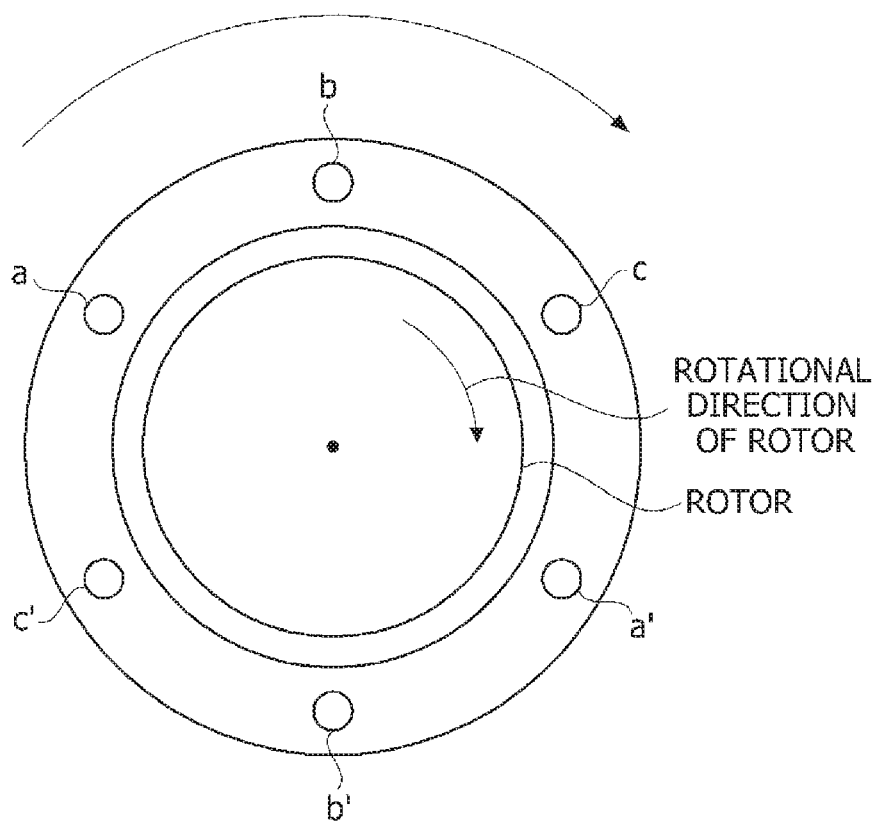
FIG. 2 illustrates an example for illustrating a principle of a general rotating magnetic field type induction motor.

FIG. 2 illustrates an example for illustrating a principle of a general rotating magnetic field type induction motor. A principle of a general rotating magnetic field type induction motor 20 will be described with reference to FIG. 2.

The rotating magnetic field type induction motor 20 is an induction motor which uses a rotating magnetic field formed by sequentially applying electricity to each of electromagnetic coils located at symmetrical points. Referring to FIG. 2, when electricity is applied to electromagnetic coils a and a', the electromagnetic coil a may have N polarity and the electromagnetic coil a' may have S polarity. Next, when electricity is applied to electromagnetic coils b and b', the electromagnetic coil b may have N polarity and the electromagnetic coil b' may have S polarity. When the electricity is sequentially applied as described above, a rotating magnetic field is generated as a permanent magnet rotates and a cylindrical rotor rotates in a direction of the rotating magnetic field.

The rotating magnetic field type induction motor 20 may use three-phase power in many cases. The three-phase power includes U-phase power, V-phase power, and W-phase power, and the powers have 120 degree phase differences. For example, the U-phase power may have a phase 120 degrees faster than the V-phase power, and the V-phase power may have a phase 120 degrees faster than the W-phase power. Referring to FIG. 2, the U-phase power may be applied to the electromagnetic coils a and a', the V-phase power may be applied to the electromagnetic coils b and b', and the W-phase power may be applied to electromagnetic coils c and c'. Naturally, in this case, rotating magnetic fields may be sequentially formed in an order of the electromagnetic coils a and a', the electromagnetic coils b and b', and the electromagnetic coils c and c' due to the phase differences of the three-phase power. The cylindrical rotor may rotate in the direction of the rotating magnetic fields due to the rotating magnetic fields formed by the three-phase power.

Figure 3:
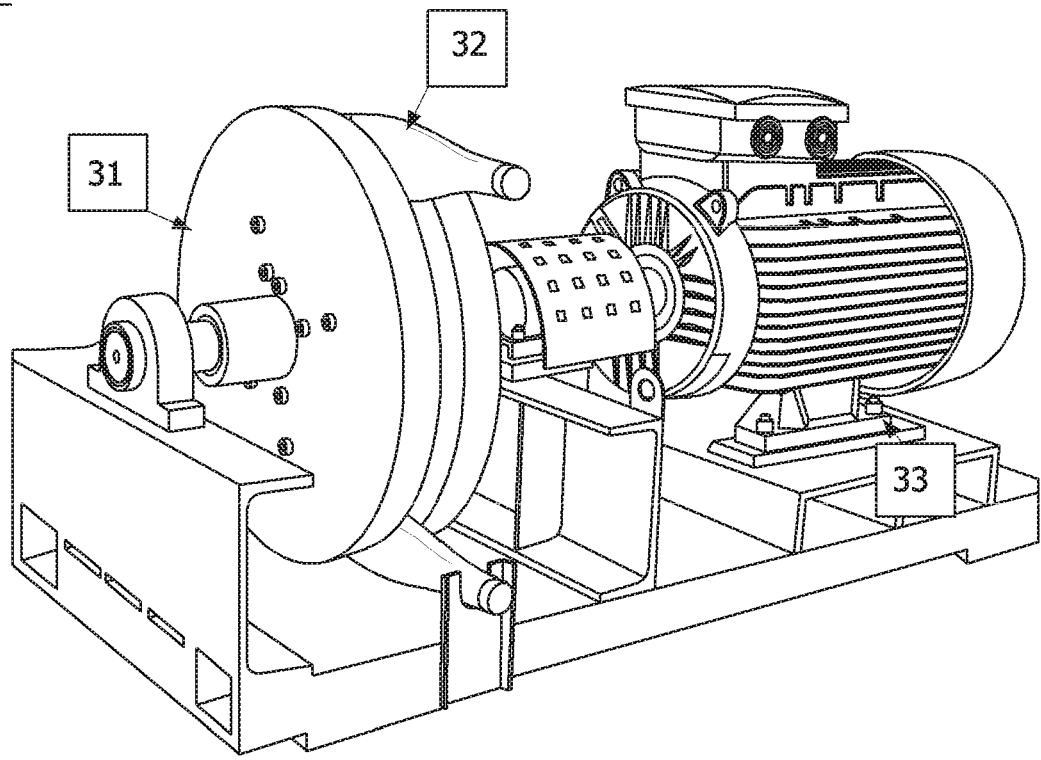
FIG. 3 illustrates an example of a general rotating magnetic field type induced electromagnetic pump using a permanent magnet.

FIG. 3 illustrates an example of a general rotating magnetic field type induced electromagnetic pump using a permanent magnet. A rotating magnetic field type induced electromagnetic pump 30 using a permanent magnet will be described with reference to FIG. 3.

The rotating magnetic field type induced electromagnetic pump 30 may include a circular magnetic plate 31, a flow channel pipe 32, and a motor 33. The circular magnetic plate 31 is a circular plate on which permanent magnets are arranged at certain intervals. The flow channel pipe 32 is a flow channel through which a conducting fluid may pass. The motor 33 may receive power and may rotate the circular magnetic plate 31.

The rotating magnetic field type induced electromagnetic pump 30 replaces the rotor of the general induction motor 10 with the flow channel pipe 32 and rotates the circular magnetic plate 31 instead of the permanent magnet. Due to the rotation of the circular magnetic plate 31, the conducting fluid located in the flow channel pipe 32 moves in a rotational direction of the circular magnetic plate 31 instead of the rotor. Accordingly, when the flow channel pipe 32 is disposed along a circumference of the circular magnetic plate 31, the conducting fluid in the flow channel pipe 32 may flow through the flow channel pipe 32 along the circumference of the circular magnetic plate 31 due to the rotation of the circular magnetic plate 31.

Since the rotating magnetic field type induced electromagnetic pump 30 uses the rotation of the circular magnetic plate 31 due to driving power of the motor 33, there may be problems such as vibrations generated by the circular magnetic plate 31, a detachment of the permanent magnets disposed on the circular magnetic plate 31 caused by the vibrations, a reduction of driving efficiency of the circular magnetic plate 31 by the motor 33, and the like.

Figure 4:
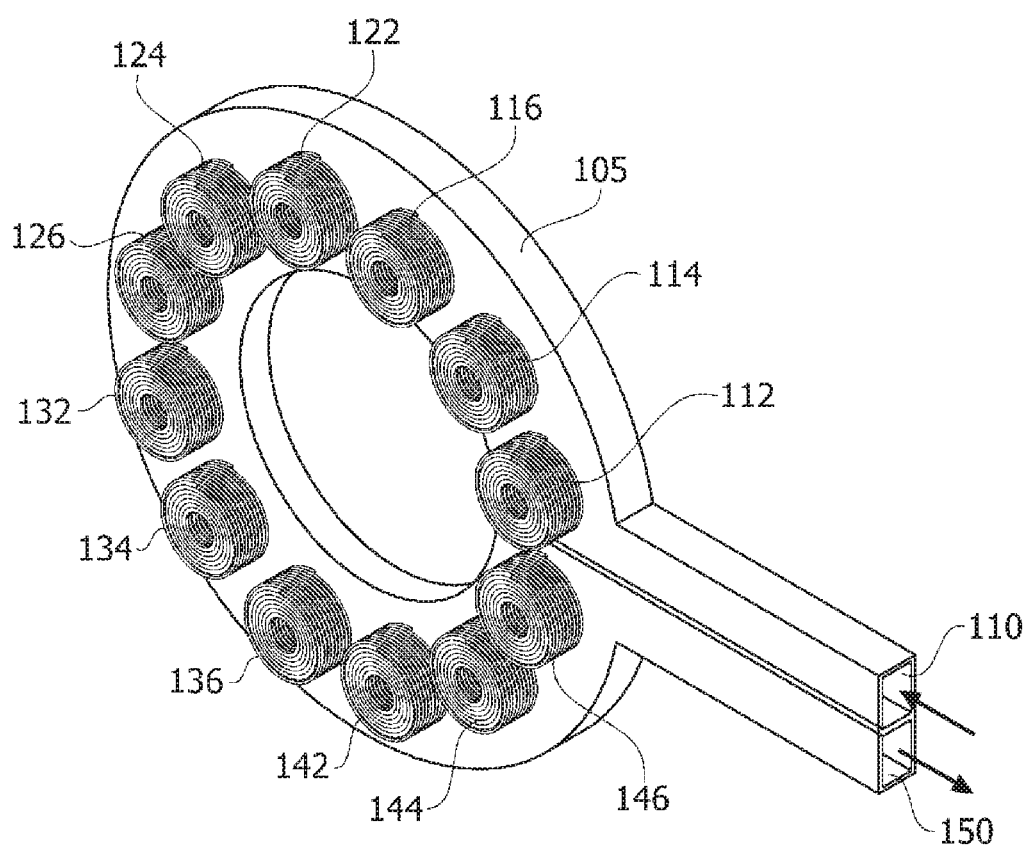
FIG. 4 is a perspective view of an induced electromagnetic pump according to one embodiment of the present invention from one side.
Figure 5:
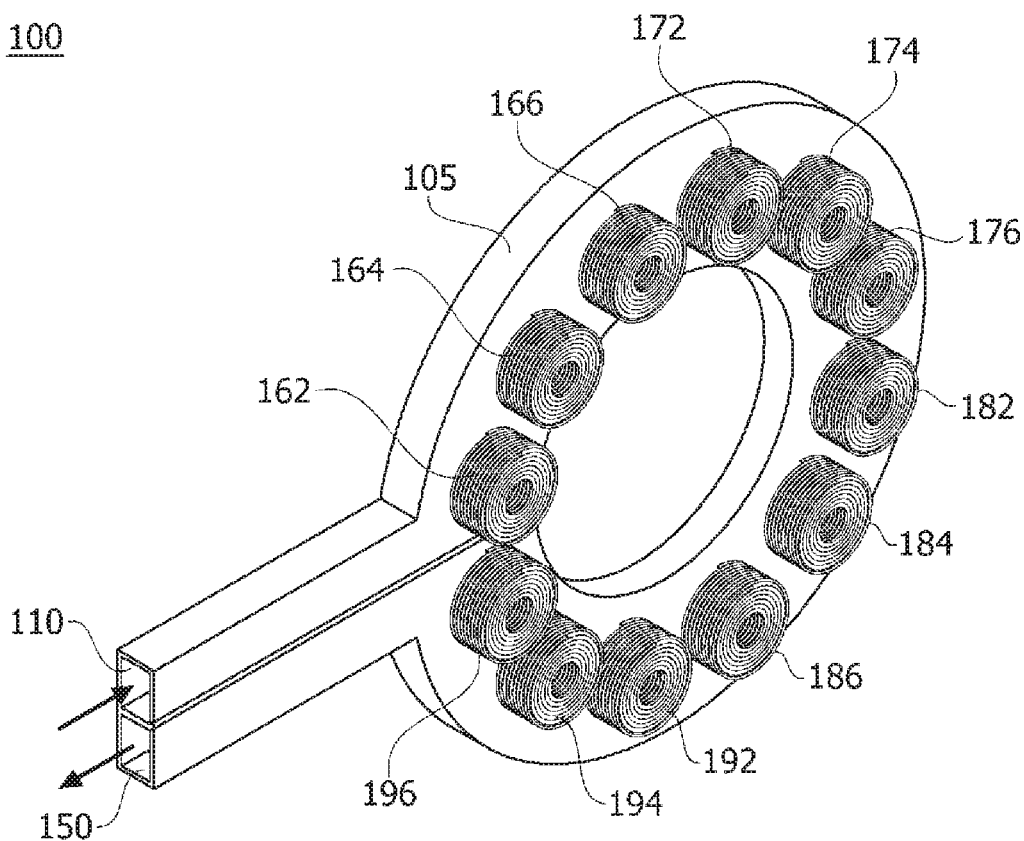
FIG. 5 is a perspective view of the induced electromagnetic pump of FIG. 4 from the other side.
Figure 6:
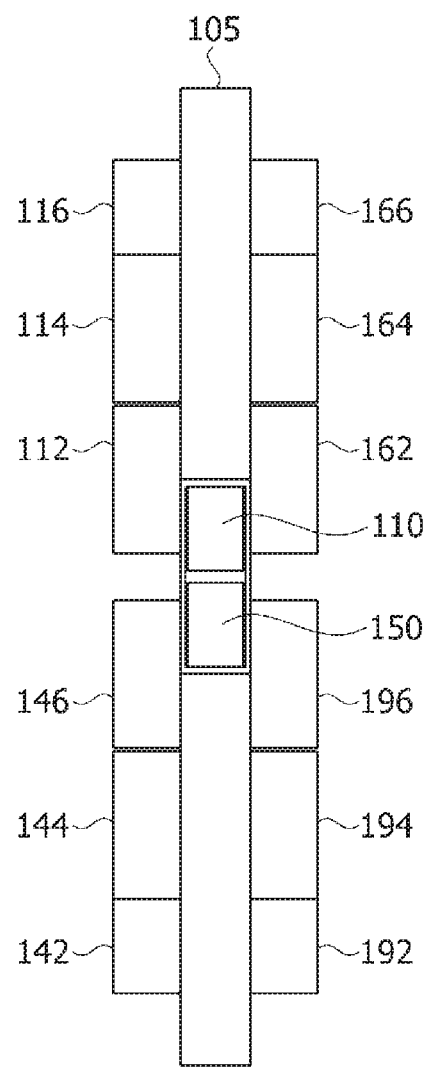
FIG. 6 is a side view illustrating a fluid inlet and a fluid outlet of the induced electromagnetic pump according to one embodiment of the present invention.

FIG. 4 is a perspective view of an induced electromagnetic pump according to one embodiment of the present invention from one side, FIG. 5 is a perspective view of the induced electromagnetic pump of FIG. 4 from the other side, and FIG. 6 is a side view illustrating a fluid inlet and an a fluid outlet of the induced electromagnetic pump according to one embodiment of the present invention.

An induced electromagnetic pump 100 according to one embodiment of the present disclosure will be described in detail with reference to FIGS. 4 and 6.

The induced electromagnetic pump 100 according to one embodiment of the present invention is an electromagnetic pump using a rotating magnetic field. In the induced electromagnetic pump 100, to address the weakness of the rotating magnetic field type induced electromagnetic pump 30, the motor 33 and the circular magnetic plate 31 are excluded therefrom and the principle of the rotating magnetic field type induction motor 20 shown in FIG. 2 is applied thereto.

The induced electromagnetic pump 100 may include a flow channel pipe 105 through which a conducting fluid passes, a fluid inlet 110 formed at an outer surface of the flow channel pipe 105 in any one direction and through which the conducting fluid flows into the flow channel pipe 105, a fluid outlet 150 formed at the outer surface at which the fluid inlet 110 is formed in the same direction thereas and through which a conducting fluid is discharged from the flow channel pipe 105 to the outside, and a plurality of electromagnetic coils 112, 114, 116, 122, 124, 126, 132, 134, 136, 142, 144, 146, 162, 164, 166, 172, 174, 176, 182, 184, 186, 192, 194, and 196 (hereinafter, referred to as electromagnetic coils 112 to 196 for convenience of description) arranged at any one surface of the flow channel pipe 105 at certain intervals and connected to U-phase power, V-phase power, and W-phase power.

The flow channel pipe 105 may include a flow channel through which a conducting fluid passes. The conducting fluid may flow in a liquid state and may have a property of a conductor which is electrifiable. For example, the conducting fluid may include mercury, liquid indium, or liquid sodium, but is not limited thereto.

The flow channel pipe 105 may have an annular shape with a hollow therein. The conducting fluid passes through the hollow inside of the flow channel pipe 105. The flow channel pipe 105 may have an annular doughnut shape, as shown in FIG. 4, which is merely an example, but is not limited thereto.

The fluid inlet 110 is an inlet through which the conducting fluid flows into the flow channel pipe 105. The fluid inlet 110 is formed at one surface of the flow channel pipe 105 and may be formed to protrude by a certain length therefrom.

The fluid outlet 150 is an outlet through which the conducting fluid flows outward from the flow channel pipe 105. The fluid outlet 150 is formed at one surface of the flow channel pipe 105 and may be formed to protrude by a certain length therefrom. According to one embodiment of the present invention, the fluid outlet 150 may be formed at the same surface as the one surface of the flow channel pipe 105 at which the fluid inlet 110 is formed, and may be formed to protrude in the same direction as the direction in which the fluid inlet 110 protrudes. As shown in FIG. 4, the fluid outlet 150 and the fluid inlet 110 may be formed in parallel at the one surface of the flow channel pipe 105 while being in contact with an outer surface of the fluid inlet 110.

As shown in FIGS. 4 to 6, when the flow channel pipe 105 is formed in a circular shape and the fluid inlet 110 and the fluid outlet 150 are formed in the same direction, there is an effect of miniaturizing circulating pipe equipment.

The plurality of electromagnetic coils 112 to 196 are wound in a certain direction and may form a magnetic field in a certain direction when electricity is applied to the coils 112 to 196.

Referring to FIGS. 4 and 5, the plurality of electromagnetic coils 112, 114, 116, 122, 124, 126, 132, 134, 136, 142, 144, and 146 (hereinafter, referred to as electromagnetic coils 112 to 146 for convenience of description) may be located at a first surface, which is one surface of the flow channel pipe 105, and the plurality of electromagnetic coils 162, 164, 166, 172, 174, 176, 182, 184, 186, 192, 194, and 196 (hereinafter, referred to as electromagnetic coils 162 to 196 for convenience of description) may be located at a second surface which faces the first surface of the flow channel pipe 105.

Some of the electromagnetic coils 112 to 196 located at the same surface are positioned to form a magnetic field in the same direction. For example, the electromagnetic coils 112 to 146 may be positioned to form the magnetic field such that its N polarity faces the first surface when electricity is applied thereto, and the electromagnetic coils 162 to 196 may be positioned to form the magnetic field such that its S polarity faces the second surface when electricity is applied thereto.

According to one embodiment of the present invention, the plurality of electromagnetic coils 112 to 196 may be located at one surface of the flow channel pipe 105 at certain intervals. As shown in FIGS. 4 and 5, the plurality of electromagnetic coils 112 to 196 may be located at certain intervals along a circumference of the flow channel pipe 105 in a circular shape.

Referring to FIGS. 5 and 6, the electromagnetic coils 112 to 146 and the electromagnetic coils 162 to 196 may be located on the first surface and the second surface which face each other based on the flow channel pipe 105, respectively. Pairs of electromagnetic coils may be positioned to face each other at points of the first surface and the second surface which face each other. The same phases of power are applied to pairs of electromagnetic coils 112-162, 114-164, 116-166, 122-172, 124-174, 126-176, 132-182, 134-184, 136-186, 142-192, 144-194, and 146-196, and magnetic fields having opposite polarities based on opposite surfaces are formed thereby when the powers are applied thereto.

For example the electromagnetic coil 112 and the electromagnetic coil 162 are positioned at points of the first surface and the second surface which face each other. When the same phase of power is supplied to the electromagnetic coil 112 and the electromagnetic coil 162, the electromagnetic coil 112 forms N polarity of a magnetic field with respect to the first surface of the flow channel pipe 105 and the electromagnetic coil 162 on the opposite side forms S polarity of the magnetic field with respect to the second surface. Since the magnetic field is formed as described above, the same effect as the case in which permanent magnets are positioned around a circular plate as shown in FIG. 1 may occur.

In the above description, the electromagnetic coil 112 and the electromagnetic coil 162 are described as an example. However, the electromagnetic coils 112, 114, 116, 122, 124, 126, 132, 134, 136, 142, 144, and 146 which are located on the first surface are wound in the same direction and form first magnetic fields with the same polarity with respect to the surface when power is applied thereto. The electromagnetic coils 162, 164, 166, 172, 174, 176, 182, 184, 186, 192, 194, and 196 which are positioned on the second surface that faces the first surface form magnetic fields with a polarity opposite to that of the first magnetic field when the power is applied thereto.

Referring to FIGS. 4 to 6, the plurality of electromagnetic coils 112 to 196 are connected to three-phase power. The three-phase power includes U-phase power, W-phase power, and V-phase power. The plurality of electromagnetic coils 112 to 196 is connected to the U-phase power, W-phase power, and V-phase power.

According to one embodiment, to efficiently move a conducting fluid in the flow channel pipe 105, the plurality of electromagnetic coils 112 to 196 connected to the U-phase power, W-phase power, and V-phase power may be sequentially positioned in such an order from the fluid inlet 110 to the fluid outlet 150. For example, the electromagnetic coil 112 may be connected to the U-phase power, the electromagnetic coil 114 may be connected to the W-phase power, the electromagnetic coil 116 may be connected to the V-phase power, and the other electromagnetic coils 122 to 196 may be connected to any one of powers included in the three-phase power in the above order.

Figure 7:
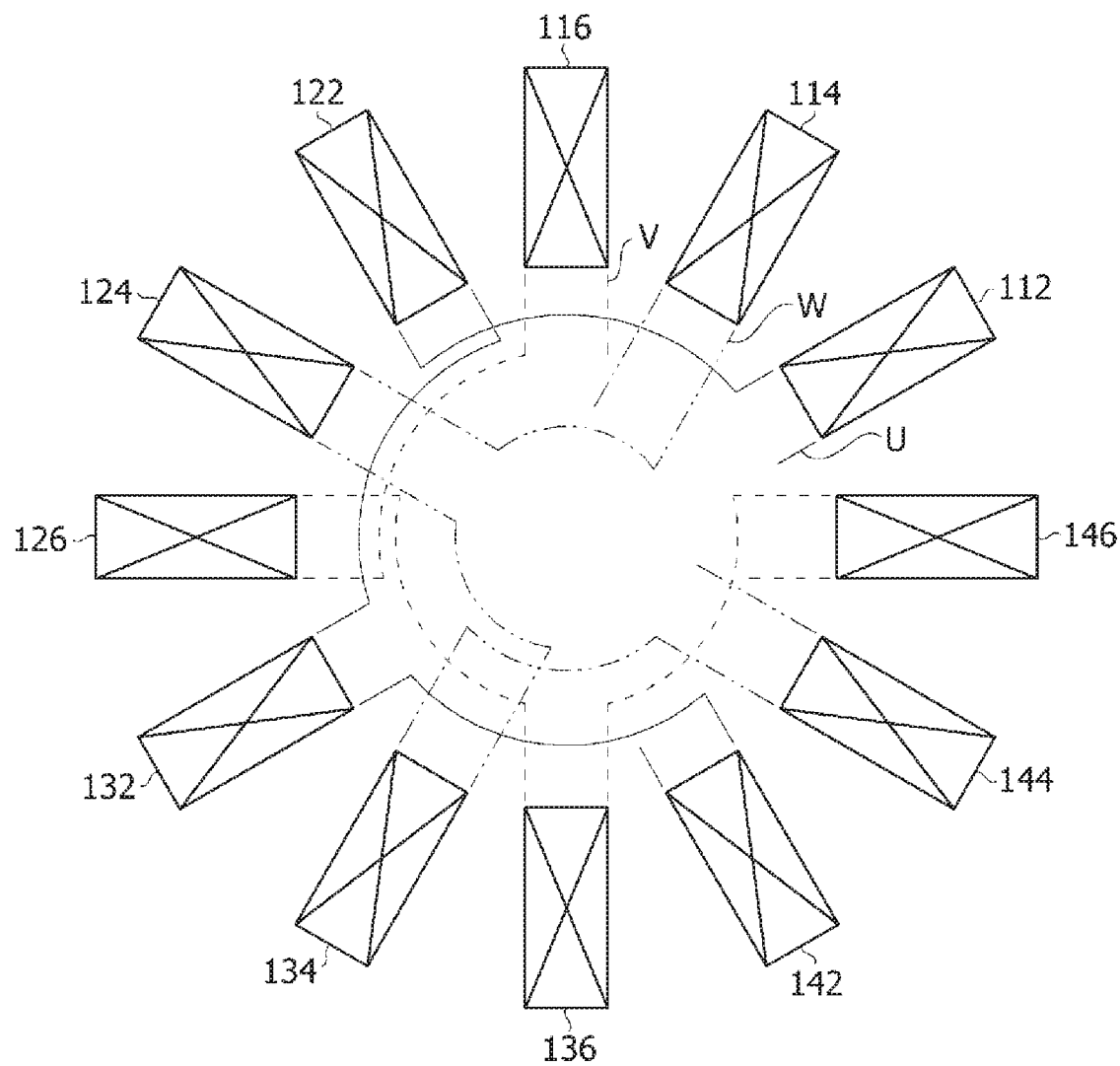
FIG. 7 illustrates one example of a connection of three-phase power connected to electromagnetic coils of the induced electromagnetic pump according to one embodiment of the present invention.

FIG. 7 illustrates one example of a connection of the three-phase power connected to the electromagnet coils of the induced electromagnetic pump according to one embodiment of the present invention. The connection of the three-phase power of the induced electromagnetic pump 100 according to one embodiment of the present invention will be described with reference to FIG. 7.

Although only the electromagnetic coils 112 to 146 are shown in FIG. 7, since the electromagnetic coils 162 to 196 located on the opposite surface are identically connected, a detailed description thereof will be omitted to avoid a repeated description.

Referring to FIG. 7, the electromagnetic coils 112, 122, 132, and 142 may be connected to the U-phase power, the electromagnetic coils 114, 124, 134, and 144 may be connected to the W-phase power, and the electromagnetic coils 116, 126, 136, and 146 may be connected to the V-phase power.

The U-phase power, W-phase power, and V-phase power may have 120 degree phase differences from one another. Accordingly, when connected as shown in FIG. 7, a rotating magnetic field may be formed counterclockwise in a direction of the electromagnetic coil 112, the electromagnetic coil 114, and the electromagnetic coil 146.

Figure 8:
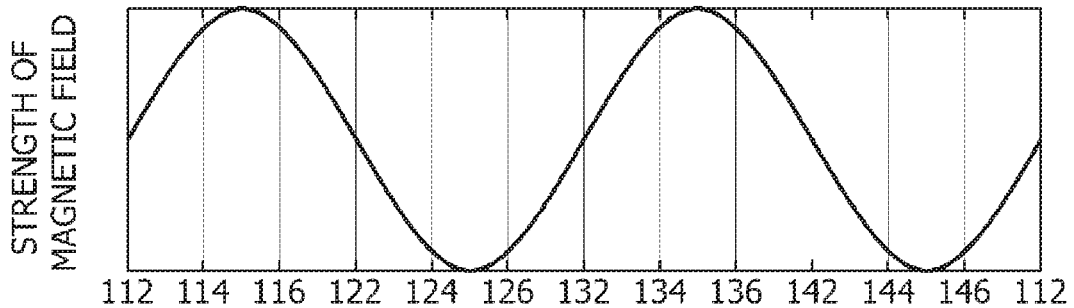
FIG. 8 illustrates one example of changes in magnetic fields of the electromagnetic coils of the induced electromagnetic pump according to one embodiment of the present invention.
Figure 8:
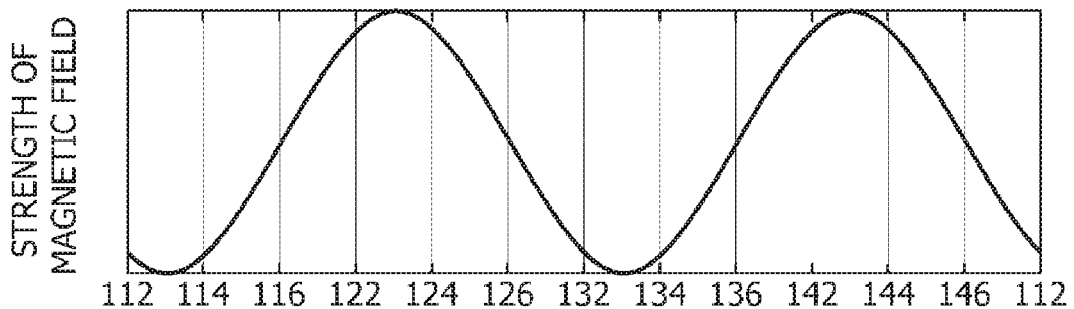
Figure 8:
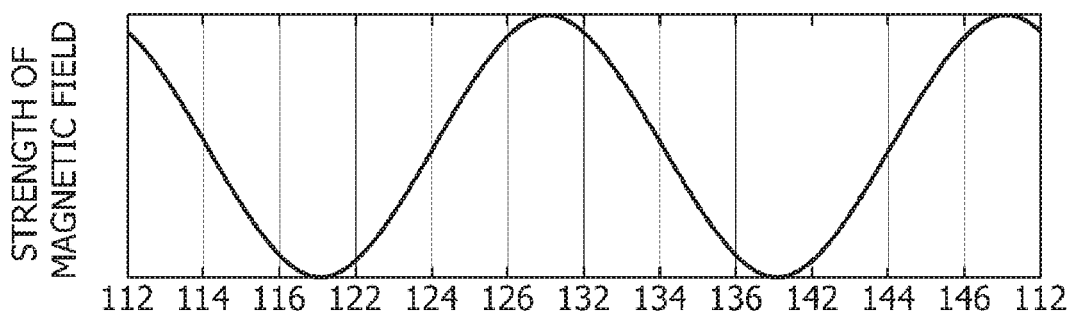

FIG. 8 illustrates one example of changes in magnetic fields of the electromagnet coils of the induced electromagnetic pump according to one embodiment of the present invention. Referring to FIG. 8, the changes in magnetic fields of the electromagnetic coils will be described under the assumption that a period of the three-phase power is T.

Referring to FIG. 8, a first graph 710 shows strengths of the magnetic fields of the electromagnetic coils 112 to 196 at a random time point t. A second graph 720 shows the strengths of the magnetic fields of each of the electromagnetic coils 112 to 196 when time passes beyond the time point t. A third graph 730 shows the strengths of the magnetic fields of the electromagnetic coils 112 to 196 when time passes beyond the time point t.

Referring to each of the graphs shown in FIG. 8, the strengths of the magnetic fields periodically change in a direction of the electromagnetic coil 112, the electromagnetic coil 114, and the electromagnetic coil 146. Due to such a change of magnetic field, a rotating magnetic field may be formed.

According to one embodiment of the present invention, since there are less vibrations and noise in an induced electromagnetic pump according to the present invention than in a general mechanical pump, a structure is simplified, and a liquid metal is transferred without contact, the induced electromagnetic pump has an advantageous effect regarding stability and maintenance.

Also, since mechanically driven components are not necessary and miniaturization is possible in an induced electromagnetic pump according to the present invention, the induced electromagnetic pump has an effect of being used not only for an installation of miniaturized experiment but also for transferring an industrially-used liquid metal.

While the embodiments of the present invention have been described above with reference to the attached drawings, it should be understood by one of ordinary skill in the art that the present invention can be modified in various detailed forms without departing from the technical concept and essential features of the present invention. Therefore, the embodiments described above should be understood as being exemplary and not limiting in every aspect.

What is claimed is:

1. An induced electromagnetic pump comprising:
    an annular flow channel pipe through which a conducting fluid passes;
    a fluid inlet formed at an outer surface of the flow channel pipe in one direction and through which the conducting fluid flows into the flow channel pipe;
    a fluid outlet formed at the outer surface at which fluid inlet is formed in the same direction thereas and through which the conducting fluid is discharged from the flow channel pipe; and
    a plurality of electromagnetic coils formed in a cylindrical shape wound in a common direction and arranged at certain intervals on one surface of the flow channel pipe and connected to U-phase power, V-phase power, and NV-phase;
    wherein the plurality of electromagnetic coils are arranged in plurality so as to face both sides of the flow channel pipe,
    wherein the plurality of electromagnetic coils are sequentially disposed from the fluid inlet to the fluid outlet, the electromagnetic coils connected to the U-phase power source, the V-phase power source and the W-phase power source,
    wherein electromagnetic coils arranged to face each other are connected to the same power source;
    wherein an inlet flow direction of the conducting fluid is parallel and opposite to an outlet flow direction of the conducting fluid;
    wherein each of the plurality of electromagnetic coils has a respective central axis that is radially offset from a central axis of the annular flow channel pipe.

2. The induced electromagnetic pump of claim 1, wherein the fluid inlet and the fluid outlet are arranged in the same radial plane of the annular flow channel pipe.

3. The induced electromagnetic pump of claim 1, wherein a circular conducting plate with permanent magnets which is rotated to drive the conducting fluid through the annular flow channel pipe.

* * * * *